US005728766A

United States Patent [19]

Schauder et al.

[11] Patent Number: 5,728,766
[45] Date of Patent: Mar. 17, 1998

[54] ETHYLENE ELASTOMER COMPOUNDS HAVING GOOD PROCESSABILITY AND AGEING PROPERTIES

[75] Inventors: Jean-Roch Hector Schauder, Wavre, Belgium; Timothy Arthur Mills, Southampton, United Kingdom

[73] Assignee: Exxon Chemical Co., Houston, Tex.

[21] Appl. No.: 318,893

[22] PCT Filed: Mar. 19, 1993

[86] PCT No.: PCT/EP93/00683

§ 371 Date: Jan. 9, 1995

§ 102(e) Date: Jan. 9, 1995

[87] PCT Pub. No.: WO93/21270

PCT Pub. Date: Oct. 28, 1993

[30] Foreign Application Priority Data

Apr. 8, 1992 [GB] United Kingdom ............... 9207736

[51] Int. Cl.$^6$ ............................. C08L 23/16; C08K 3/04
[52] U.S. Cl. ............... 524/496; 423/449.1; 423/445 R; 525/236; 525/237; 525/240; 525/242; 523/215; 523/468
[58] Field of Search ............... 524/496; 423/449.1, 423/445 R; 525/236, 237, 240, 242; 523/215, 468

[56] References Cited

U.S. PATENT DOCUMENTS

| 2,316,418 | 4/1943 | Halgood | 524/496 |
|---|---|---|---|
| 3,355,247 | 11/1967 | Krejci | 23/209.4 |
| 3,468,979 | 9/1969 | Hamed et al. | 525/236 |
| 3,884,993 | 5/1975 | Gros | 260/897 |
| 4,078,131 | 3/1978 | de Zarauz | 526/20 |
| 4,255,296 | 3/1981 | Ogawa et al. | 525/315 |
| 4,259,468 | 3/1981 | Kajiura et al. | 525/332 |
| 4,722,971 | 2/1988 | Datta et al. | 525/240 |
| 4,786,697 | 11/1988 | Cozewith et al. | 525/236 |
| 4,788,229 | 11/1988 | Bohm et al. | 523/215 |
| 4,789,714 | 12/1988 | Cozewith et al. | 525/323 |
| 4,792,595 | 12/1988 | Cozewith et al. | 525/323 |
| 4,874,820 | 10/1989 | Cozewith et al. | 525/240 |
| 4,994,534 | 2/1991 | Rhee et al. | 526/88 |
| 5,013,801 | 5/1991 | Cozewith et al. | 525/240 |
| 5,116,940 | 5/1992 | Eisinger | 528/483 |

FOREIGN PATENT DOCUMENTS

| 1 339 061 | 11/1973 | United Kingdom . |
| 1 543 821 | 4/1979 | United Kingdom . |
| 2 023 443 | 1/1980 | United Kingdom . |

OTHER PUBLICATIONS

"Designing EPDM for Production Efficiency", by G. Stella and N. P. Cheremisinoff, Polymer Plastic Technology and Engineering 28, No. 2, pp. 185–199 (1989).

"Elastomers, Synthetic (Ethylene–Propylene)", by E. L. Borg in Encyclopedia of Chemical Technology, 3rd. Ed., vol. 8, pp. 492–500 (Kirk–Othermer).

"Ethylene–Propylene Elastomers", by G. Ver Strate in Encyclopedia of Polymer Science and Engineering, 2nd. Ed., vol. 6, pp. 522–564 (J. Wiley & Sons, 1986).

"Polyolefin Elastomers of Ethylene and Propylene", F. P. Baldwin and G. Ver Strate, Rubber Chemistry Technology, 45, pp. 709–881 (1972).

*Analysis of Rubber and Rubber–like Polymers*, Chapter 11, pp. 220–238 (Applied Schience Publishers, 3rd. Ed., 1983).

Primary Examiner—Vasu Jagannathan
Assistant Examiner—Olga Asinovsky
Attorney, Agent, or Firm—Douglas W. Miller

[57] ABSTRACT

Compounds having improved properties of processability and elasticity after heat aging for molded and extruded rubber parts can be prepared by utilizing improved processability EPM and/or EPDM rubber with effective amounts of carbon black prepared in a manner such that it has an average particle size of from 70 to 120 nanometers, a particle size distribution including from 40 to 225 nanometers sized particles, a surface area of 16 to 30 m$^2$/g as measured by the BET adsorption, and a structure of 90 to 125 as measured by DBP absorption. The EPM and EPDM rubber useful in accordance with the invention will include those multimodal polymer blends that comprise at least two fractions having different molecular weight and, optionally, monomer composition. The invention compounds find particular use in automotive industry parts requiring high temperature tolerance, such as coolant hoses.

8 Claims, No Drawings

ETHYLENE ELASTOMER COMPOUNDS HAVING GOOD PROCESSABILITY AND AGEING PROPERTIES

TECHNICAL FIELD

This invention relates to vulcanizable olefinic elastomers and to specific applications of compositions comprising them. In particular the invention relates to elastomeric compositions having improved properties of processability, compound strength and elasticity before and after vulcanization, and long-term heat resistance of the vulcanized compounds.

BACKGROUND ART

The use of vulcanized rubber in many applications is well documented in public literature. Due to the inherent properties of the essentially elastic olefinic polymers many enduse applications require the use of modifying and reinforcing materials to bring out desired properties. Thus a rubber compounder will strive to arrive at a formulation that will give the best balance of processing behaviour, vulcanization (cure) rate, vulcanizate physical properties and cost. The olefin-based elastomers of this invention are well-known to be some of the cheapest polymers currently available and yet still capable of achieving excellent properties in many of the otherwise most adverse applications.

Olefinic rubbers find many uses in the automotive industry because of their relatively low cost and as well because of their properties with respect to moldability and extrudability, or ability to be readily shaped as desired, and their ability to withstand oxidative attack. In particular the rubber compounds based upon ethylene-propylene monomer ("EPM") and ethylene-propylene-diene monomer ("EPDM") elastomeric polymers are playing an ever-expanding role both for underhood and body sealing parts. In particular it is known that certain EPDM grades have shown excellent promise as automotive coolant hose polymers and as seals and gaskets for both the automotive and building industries where large temperature extremes test the ability to maintain an elastic seal.

In these applications it is known that the preferred compounds can typically have 120–170 parts per hundred parts rubber ("phr") of industry-used carbon blacks as reinforcing fillers that serve to both strengthen and further reduce the overall cost of the compounds. The typically used and recommended carbon blacks are those furnace blacks meeting ASTM designations (ASTM D 1765–1979) and falling into the following classes: N550 FEF, N650 GPF, N762 SRF and N683 APF. Among these, N650/683 and N762 are closely defined as standard blacks in ISO/DIN 6809.

The usefulness of EPDM polymers in these compounds depends on the cure rate and cure state as well as the ease of fabrication. Thus it is known that improved properties of faster cure and better processing properties can be achieved where the polymers have selected molecular weight distribution ("MWD") and intermolecular compositional distribution. Means of preparing the preferred broad MWD polymers meeting these criteria are disclosed in the patent literature. Representative recent patents addressing the preparation of such polymers are U.S. Pat. Nos. 4,722,971, 4,789,714, 4,792,595, 4,874,820, and 5,013,801. Earlier patents that similarly address the preparation of specially tailored grades of EPM and EPDM polymers include GB 1 339 061, U.S. Pat. No. 3,468,979, U.S. Pat. No. 3,884,993, GB 1 543 821, and GB 2 023 443.

Several of the documents above disclose the use of specific carbon black fillers. In U.S. Pat. No. 4,722,971 carbon black N650 is used in an amount of 140 phr. In U.S. Pat. No. 4,792,595 the use of 80 phr of "high abrasion furnace black" is disclosed. U.S. Pat. No. 3,884,993 teaches that 10–200 phr of carbon black, as a conventional filler, can be used with improved processability rubber. GB 1 543 821 exemplifies the use of 70 parts "FEF black". GB 2 032 443 teaches that up to 300% by weight of fillers, including carbon black, can be used in improved processability rubbery copolymers and exemplifies the use of a carbon black SEAST H® (TOKAI Carbon Co., Japan) in the amount of 67 parts by weight.

Additionally, automotive hose compounds utilizing carbon blacks a) N650 GPF-HS (115 parts) with N762 SRF-LM (115 parts) with 137.5 parts EPDM rubber blend of high and low MW commercial grades (VISTALON® 3777 and VISTALON® 7000) and b) N550 FEF (110 phr) with N762 SRF-LM (50 phr) with improved processing VISTALON® 7500 EPDM rubber are recommended in the VISTALON® Ethylene-Propylene Rubber User's Guide (Exxon Chemical Company brochure 201-0888-01A, 1988) at page 10-7. It is stated that due to increased underhood temperatures, it is appropriate to utilize selected ingredients in order to formulate EPM and EPDM compounds with high heat resistance.

INVENTION DISCLOSURE

It has been surprisingly found that particularly effective vulcanizable olefinic elastomer compounds can be prepared by carefully selecting both the elastomeric polymer and the carbon black used as reinforcing filler. Accordingly compounds having optimal properties for molded and extruded rubber parts can be prepared by utilizing improved processability EPM and EPDM rubber with effective amounts of carbon black prepared in a manner such that it has an average particle size of from above 70 to 120 nanometers, a particle size distribution including from 40 to 225 nanometers sized particles, and a surface area of 16 to 30 $m^2/g$ as measured by the BET analytical technique. The carbon black structure is 90–125 ml/100 g as measured by DBP absorption. The EPM and EPDM rubber useful in accordance with the invention will include those multimodal polymer blends that comprise at least two fractions having different molecular weights and, optionally, monomer composition. A first fraction will comprise between 70 and 95 wt. % of the total polymer content and will have a Mooney viscosity (ML(1+8), 125° C.) between 20 and 80, an $M_w/M_n$ between 1 and 8, ethylene content of 45 to 65 wt. % polymer, and a diene monomer content of 1 to 9 wt. % polymer. A second fraction will comprise 5 to 30 wt. % of the total polymer and will have a Mooney viscosity (ML(1+8), 125° C.) between 200 and 70,000, an $M_w/M_n$ between 1 and 8, ethylene content of 45 to 70 wt. % polymer, and a diene monomer content of 0 to 9 wt. % polymer. Additional fractions may be optionally included so long as the foregoing conditions are met and may be part of the first or second fractions where meeting the criteria of those fractions, or may be totally different fractions present in amounts not sufficient to cause a significant deterioration of the sought properties.

By combining a multimodal polymer blend as described with the specific carbon black described, and with the traditional compounding ingredients, it has been discovered possible to produce novel compounds having significantly improved properties combining easier processing, vulcanized strength, and retained elasticity after heat aging, as has been sought for the rapidly developing automotive industry with its increasingly higher temperature tolerance requirements.

BEST MODE AND EXAMPLES OF THE INVENTION

The "improved processability EPM and/or EPDM rubber" of this invention is defined for the purpose of this description, and for the claims, as those vulcanizable elastomeric ethylene-containing polymers (1) formed from $C_3$–$C_{16}$ alpha-olefins and, optionally, co-polymerizable non-conjugated dienes, and (2) prepared or blended so as to have the multimodal characteristics providing the ease of processing sought. The preferred alpha-olefins are typically $C_3$–$C_6$ alphaolefins and the most preferred are propylene, butene-1 and hexene-1. The non-conjugated dienes are any of those known in the art to be capable of Ziegler-Natta coordination polymerization with the alpha-olefins. The typically preferred dienes are the bridged ring dienes described in U.S. Pat. No. 4,722,971, particularly 5-ethylidene-2-norbornene, methylene norbornene, and vinylidene-norbornene. A fuller listing of suitable dienes and alphaolefins appears in U.S. Pat. No. 5,013,801. Both U.S. patents are incorporated by reference for purposes of U.S. patent practice. Additionally the use of the terms copolymer and terpolymers is to be interpreted in their generic sense as including tetrapolymers, pentapolymers, etc. Thus one or more alpha-olefins and/or one or more dienes may be copolymerized with ethylene to form the vulcanizable elastomeric polymers of the invention.

The improved processability EPM and/or EPDM rubber of this invention is prepared or blended so as to have the multimodal characteristics providing ease of processing as is described in the background art patent documents. For example, these elastomeric polymers formed by Ziegler-Natta coordination polymerization are physically blended, are prepared utilizing catalysts systems selected for their ability to form broad MWD polymers, are prepared in multiple reactors, or are prepared in tubular reactors with multiple inlet ports for monomer and catalysts injection. Such methods are well-documented in U.S. Pat. Nos. 4,722, 971, 4,786,697, 4,789,714, 4,792,595, 4,874,820, 5,013,801, 3,468,979, and 3,884,993. All of which are incorporated by reference for purposes of U.S. patent practice. GB 1 339 061, GB 1 543 821, and GB 2 023 443 provide additional teaching of easy processing rubbers. U.S. equivalents 4,259, 468 and 4,078,131 are also incorporated by reference for U.S. patent practice purposes.

The relationship of polydispersity (molecular weight distribution, "MWD") to processing characteristics has been addressed in public literature for EPDM-comprising compositions. Thus it is known that the existence of high molecular weight (MW) fractions in EPDM compositions have important impacts on process rheology. The existence of such high ends can be characterized by the ratio of Z average molecular weight to weight average ($M_z/M_w$) with $M_z/M_w$ preferably being between 5 to 10, see "Designing EPDM for Production Efficiency" by G. Stella and N. P. Cheremisinoff, Polymer Plastic Technology and Engineering 28, No. 2, pages 185–199 (1989). EPDM polymers having $M_z/M_w$ below about 5 are said to have insufficient high MW fraction to achieve best processing results.

For relatively recent reviews of general methods for preparing EPM and or EPDM rubber, including catalysts, monomers, reaction conditions, etc., reference may be made to "Elastomers, Synthetic (Ethylene-Propylene)", by E. L. Borg in Encyclopedia of Chemical Technology, 3d. Ed., V.8 pp. 492–500 (Kirk-Othmer) and "Ethylene-Propylene Elastomers", by G. VerStrate in Encyclopedia of Polymer Science and Engineering, 2d. Ed., V. 6 pp. 522–564 (J. Wiley & Sons, 1986).

Additionally, it is known to incorporate "branch suppressors" during EPDM polymerization to reduce branching caused by the presence of residual sites of ethylenic unsaturation on each of the dienes. It is known in the art that certain Lewis bases, e.g., $NH_3$, are effective as branch suppressors. Additionally, certain alkoxy silanes, e.g., methyl silicate, ethyl silicate, etc., are known to act as effective branch suppressors without reducing catalyst efficiency or reactivity. These branch suppressors are added in known amounts and in accordance with the known procedures.

The improved processability EPM and/or EPDM rubber useful in accordance with the invention will include those multimodal polymer blends that comprise at least two fractions having different molecular weight and, optionally, monomer composition. A first fraction will comprise between 70 and 95 wt. %, preferably 80 to 93 wt. %, of the total polymer content and will have a Mooney viscosity (ML(1+8), 125° C.) between 20 and 80, preferably between 30 and 70; an $M_w/M_n$ between 1 and 8, preferably 1.1 to 4.5; ethylene content of 45 to 65 wt. % polymer, preferably 50 to 60 wt. %; and, a diene monomer content of 1 to 9 wt. % polymer, preferably 2 to 7 wt. %. A second fraction, different from the first fraction, will comprise 5 to 30 wt. % of the total polymer, preferably 7 to 20 wt. %, and will have a Mooney viscosity (ML(1+8), 125° C.) between 200 and 70,000, preferably between 500 and 10,000; an $M_w/M_n$ between 1 and 8, preferably 1.1 to 4.5; ethylene content of 45 to 70 wt. % polymer, preferably 50 to 65 wt. %; and a diene monomer content of 0 to 9 wt. % polymer, preferably of 1 to 7 wt. %. In a particularly preferred embodiment both first and second fractions will have respectively an $M_w/M_n$ of 1.2 to 3.5. So long as the molecular weight (represented by Mooney viscosity) of each fraction is as described, the monomer intermolecular composition distribution may be the same or different for the two fractions. Thus the skewed ethylene and diene contents disclosed in some of the background art patent documents, e.g., U.S. Pat. No. 4,722,971, represent alternative embodiments of this invention.

Vulcanization, or curing by means of cross-linking a significant portion of the elastomeric polymers of the invention, is accomplished by conventionally known means. Curatives useful for the sought cross-linking include peroxides, sulphur, sulphur donors, phenolic resins and brominated phenolic resins. Particularly preferred curatives are the peroxides for reasons of improved stability of the cross-link network at high temperatures. The peroxide curatives will include monovalent peroxides such as dibenzoyl peroxides, benzoylalkyl peroxides, alkoylalkyl peroxides, dialkoyl peroxides, dibenzyl peroxides, alkylbenzyl peroxides, dialkyl peroxides and their equivalent divalent peroxides. For additional description see "Polyolefin Elastomers of Ethylene and Propylene", F. P. Baldwin and G. VerStrate, *Rubber Chemistry and Technology*, 45, 709 (1972).

Mixing prior to vulcanization is typically accomplished by either the single or multi-step methods practiced in the relevant industries. In the single-step method the polymer(s), carbon black filler, conventional additives and modifiers, and curatives (last) are blended at temperatures as high as possible to facilitate the blending, but below the activation temperature of the curative. For example, blending is accomplished below the decomposition temperature of the peroxy curative when such is used (typically at 100° C. when bis(t-butylperoxyy-isopropyl) benzene is used). In the multi-step method, the blending of all ingredients other than the curative is accomplished in one or more steps at higher temperatures, e.g., 140° C., and the blend is subsequently cooled before addition of the curative. Internal mixers such as those with tangential or intermeshing rotors, e.g. a Banbury, are typically used for the single-step method or the initial mixing steps of the multi-step method. The necessary cooling is typically done on an open mill with subsequent addition and blending of the curative on the mill, or in a Banbury or other internal mixer. The thus compounded olefinic elastomer blend is shaped by molding or extrusion and typically raised to a temperature of 150° C. to 240° C. The heat activates the cross-linking reaction and results in the vulcanization of the shaped compound. Any of the known methods for shaping rubber parts by molding or extrusion, and vulcanizing, will be useful in accordance with the invention. For further information see *Rubber Technology Handbook*, Hoffman (Hansen, 1989).

Carbon black used in the rubber industry currently are classified into five different types according to the method of manufacture. Thus the prevalent type is furnace black with all of channel black, lampblack, acetylene black and thermal black being much less prevalent. Each type generally meets the following characterization. The individual carbon black particles approximate to spheres in shape but exist in chains or clusters, referred to as aggregates. The aggregates in turn tend to cluster in agglomerates which are believed to break up on mixing with rubber. Aggregates however tend to escape break-up and in essence represent the units of carbon black found within the vulcanizate. The type of aggregate indicates the "structure" of the black and represents the ratio of the surface area of the black exposed to the rubber molecules to that hidden from the rubber inside pores or channels too small for the rubber molecules to penetrate. The higher the structure, the greater the number of particles per aggregate. Carbon blacks thus can be conveniently characterized accordingly by basic sphere size, structure (aggregate size and shape), and surface areas. Means of analyzing carbon black can be found in *Analysis of Rubber and Rubber-like Polymers*, Chapter 11, pages 220–238 (Applied Science Publishers, 3rd Ed., 1983).

The lampblack of this invention is one having a low surface area (high average particle size), broad particle size distribution, and a high structure. Thus the following characteristics describe the best-mode selection as currently known for the invention: (a) an average particle size of 70–120, preferably 80–120, and most preferably 100–120; (b) a broad particle size distribution including particles of at least 40 nanometers and particles of 225 nanometers., preferably 50 to 200; and (c) a surface area of 16 to 30 m²/g, preferably 18 to 28, as measured by BET analysis or 20–40 mg/g as measured by iodine adsorption. Structure should be, as measured by DBP absorption in accordance with ISO 4656-1978 (ml/100 gm), 90–125, preferably 95–108. Carbon black meeting these criteria is currently available commercially under the tradename DUREX-O® from Degussa AG, Germany. The invention carbon black is typically used within conventionally known amounts, preferably for elasticity retention from 65 up to and including 150 phr, more preferably between 70 and 115 phr. The carbon black to be used in accordance with the invention can be produced by the lampblack, also known as flameblack, method. Though such blacks are some of the oldest types known, the lampblack are not assigned ASTM designations, probably due to the current lack of use of them in large quantities. The methods of manufacture are well known and consist generally of burning a combustible liquid, extracting the smoke or fumes via a tube or chimney, and separating the carbon black via cyclone or filter separators. The combustible liquid is typically a fuel oil.

Conventional additives and modifiers typically include the following which are generally known to be useful in the indicated amounts. These compositions and amounts are to be considered illustrative and representative only, the list is not intended to represent a limitation on the invention as described.

| Function | Additive/Modifier | Amounts (phr) |
| --- | --- | --- |
| Plasticizers/process oils | paraffinic oils | 25–70 |
| Processing aids | polyethylene waxes stearic acid zinc stearate calcium stearate | 2–10 |
| Stabilizers | aromatic aimines hindered phenols or polymeric dihydroquinolines | 0.5–3.5 |
| Vulcanization activators | triallylcyanurate isocyanurate trialkyl phosphate trialkylmellitate dialkylpthalate m-phenylene-bis-maleimide ethyleneglycol-dimethylacrylate trimethylolpropane-trimethylacrylate 1,3 butyleneglycol-dimethylacrylate | 0.5–3.0 |
| Curatives | peroxides, sulphur, etc. | 1.5–10 |
| White fillers | calcium carbonate calcined clay and silica, titanium dioxide etc. | 5–50 |

Typical industrial applications of the compounds of the invention include the following: all parts which are related to liquid transfer or sealing, e.g., coolant hoses, spouted hose splicing compounds, radiator seals, brake hose tubes, hydraulic brake hose covers, brake cups; all parts related to transport of bulk materials such as minerals (coal, rock, etc.), e.g., conveyor belts; and, all parts related to high temperature service in the automotive industry, e.g., engine mounts, exhaust pipe hangers, headlamp gaskets, V-belts or in the building industry, e.g., profiles and sealing gaskets. The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

EXAMPLE 1

The EPDM polymers in this example were commercially available products characterized as shown in Table 1. The comparison product was VISTALON® 7509 (Exxon Chemical CO., Houston, Tex., USA) having an $M_z/M_w$ indicative of essentially single mode MWD. The example of the invention utilized VISTALON® 7500 (Exxon Chemical Int. Marketing B. V., Kraainem, Belgium) which has an $M_z/M_w$ indicative of a high molecular weight fraction and is sold as a tailored grade having narrow MWD, and high and low ends for good processing.

The comparison V7509 polymer and V7500 are described in Table I. The compound properties are described in Table II.

TABLE I

Polymers characteristics

| Polymer Characteristics | V 7509 Comparison | V 7500 |
|---|---|---|
| Mooney viscosity ML (1 + 8), 125° C. | 70 | 82 |
| Ethylene content wt % | 50 | 50 |
| ENB content, wt % (5-ethylidene-2-norbornene) | 2.6–3.0 | 3.5 |
| MWD $M_w/M_n$ $M_z/M_w$ | 2.5 | 6 |

The principal process benefit of using the polymer of the invention is the decrease in bulk viscosity of the compound as clearly shown by the lower compound Mooney viscosity measurement done at 100° C., compared to the V7509 comparison (See Table II).

TABLE II

Compound properties

| Polymers Characteristics | V 7509 Comparison | V 7500 |
|---|---|---|
| Mooney viscosity, ML (1 + 4) at 100° C. (ISO 289) | 103 | 82 |
| Physical properties after vulcanisation at 180° C. for 20 min.-100% Modulus, MPa | 2.5 550 | 2.6 500 |
| Elongation at break, MPa (ISO 37-1977) | | |
| Compression set, % after vulcanisation at 180° C. for 20 min.-22 h at 160° C. + 3 h at 25° C. (VW P3307) | 72 | 68 |
| Physical properties after air ageing, 96 h at 160° C. (ISO 37-1977) | | |
| 100% Modulus, MPa | 3.1 | 3.2 |
| Elongation at break, MPa | 380 | 360 |
| Physical properties after oil ageing, 22 h at 100° C. (ISO 37-1977) | | |
| 100% Modulus; MPa | 2.5 | 3.0 |
| Elongation at break, MPa | 345 | 350 |

| Formulation: | | |
|---|---|---|
| Polymer | 100 pbw | V7509 and V7500 |
| Durex-O ® (Degussa A.G., Germany) | 110 phr | carbon black filler |
| Flexon 815 ® (ESSO S.A.F., France) | 45 phr | paraffinic oil |
| Flectol H ® (Monsanto S.A., Belgium) | 1 phr | polymeric (2,2,4-trimethyl-1,2-dihydroquinoline), stabilizer |
| EDMA ® (Lehman + Voss and Co., Germany) | 0.5 phr | ethylene/glycol dimethylacrylate, activator |
| Perkadox ® 1440 (Akzo B.V., Holland) | 7 phr | bis(t-butylperoxy-isopropyl) benzene |

EXAMPLE 2

In this example, the V7500 described in Table I was compounded with 3 different types of carbon black: the flame-black which is the basis of the invention and two carbon blacks produced with a furnace process (FEF N-550 and SRF N-774). In the 3 cases, the carbon black levels were adjusted to keep the compound hardness as constant as possible. FEF N-550 black has a larger surface area (smaller average particle size) than the flame black but an almost comparable structure (comparable DBP absorption values) whereas the SRF N-774 has a comparable surface area (same average particle size) with a lower structure (Table III).

TABLE III

Carbon black characteristics

| | Durex-O ® | FEF N-550 | SRF N-774 |
|---|---|---|---|
| Surface area | | | |
| Iodine adsorption, g/kg | 28 | 44 | 25 |
| Structure | | | |
| DBP absorption, ml/100 gr | 102 | 118 | 75 |

The properties of the compounds obtained with these 3 carbon blacks are described in Table IV.

TABLE IV

Compound properties

| | Durex-O ® | FEF N-550 | SRF N-774 |
|---|---|---|---|
| Hardness (AFTM P2240-86) | 57 | 59 | 55 |
| Mooney viscosity at 100° C. (ISO 37-1977) | 87 | 79 | 73 |
| Physical properties (ISO 37-1977) after vulcanisation at 180° C. for 20. min.- | | | |
| 100% Modulus, MPa | 2.6 | 2.4 | 1.8 |
| Elongation at break, MPa | 500 | 320 | 345 |
| Compression set, % after vulcanisation at 180° C. after 20 min- 22 h at 160° C. + 3 h at 25° C. (VW P 3307) | 68 | 68 | 74 |
| Physical properties (ISO 37-1977) after air ageing, 96 h at 160° C.- | | | |
| 100% Modulus, MPa | 3.2 | 3.3 | 3.0 |
| Elongation at break, MPa | 360 | 275 | 260 |
| Physical properties (ISO 37-1977) after oil ageing, 22 h at 100° C.- | | | |
| 100% Modulus, MPa | 3.0 | 3.3 | 2.2 |
| Elongation at break, MPa | 350 | 190 | 215 |

Note: Table IV compound formulation, as in Table II with the following carbon black loading:
FEF   100 phr
SRF   130 phr
Durex-O ®   110 phr Compared to the FEF N-550 compound, the Durex-O® compound shows improved modulus at 100% elongation and, elongation at break on the original vulcanized samples as well as on the oil and air aged samples. The improvement observed with the Durex-O® compound is even more apparent when the comparison is done with the SRF N-774 compound.

Although the invention has been described with respect to particular materials, means and embodiments it is to be understood that the invention is not limited to the particulars disclosed and extends to all equivalents within the scope of the claims.

The following is claimed:

1. An elastomer compound wherein the improvement comprises an elastomer selected from the group consisting of EPM and EPDM elastomer and a carbon black said carbon black having (i) an average particle size of from 70 to 120 nanometers, (ii) a particle size distribution including from 40 to 225 nanometers sized particles, (iii) a surface area of 16 to 30 $m^2/g$ as measured by BET adsorption, and (iv) a structure of 90–125 ml/100 g as measured by DBP absorption; wherein said elastomer includes at least two fractions having different molecular weights; a) a first fraction constituting 70 to 95 weight percent of the total elastomer content, having a Mooney viscosity (ML)(1+8), 1250° C.) between 20 and 80, $M_w/M_n$ between 1 and 8, an ethylene content of 45 to 65 weight percent, and a diene monomer content of 1 to 9 weight percent; and b) a second fraction constituting 5 to 30 weight percent of the total elastomer having a Mooney viscosity (ML)(1+8), 125° C. between 200 and 70,000 end $M_w/M_n$ between 1 and 8, an ethylene content of 45 to 75 weight percent, and a diene monomer content of 0 to 9 weight percent.

2. The compound according to claim 1 wherein said first fraction a) has a Mooney viscosity (ML(1+8), 125° C.) between 30 and 70, $M_w/M_n$ of 1.1 to 4.5, ethylene content of 50 to 60 wt. % polymer, and diene monomer content of 2 to 7 wt. %; and, said second fraction b) has a Mooney viscosity (ML(1+8), 125° C.) between 500 and 10,000, an $M_w/M_n$ between 1.1 and 4.5, and a diene monomer content of 1 to 7 wt.%.

3. The compound according to claim 2 wherein both of said first fraction a) and said second fraction b) have an $M_w/M_n$ of 1.2 to 3.5.

4. The compound according to claim 3 wherein said carbon black is selected from the group consisting of lampblack and flameblack.

5. A shaped rubber product made from the vulcanizable olefinic elastomer compound of claim 1.

6. The shaped rubber product of claim 5, wherein said shaped rubber product is used repeatedly in temperatures exceeding 125° C.

7. The shaped rubber product of claim 6, wherein said shaped rubber product is selected from the group consisting of an automotive cooling hose, an automotive sealing gasket, an automotive body seal, a building seal, a building profile and a gasket for mechanical products.

8. A vulcanizable olefinic elastomer compound comprising:

a) at least two olefinic elastomers said olefinic elastomers including i) in the range of from 80 to 93 weight percent of a first olefinic elastomer said first olefinic elastomer having in the range of from 50 to 60 weight percent ethylene, in the range of from 2 to 7 weight percent diene, said first olefinic elastomer having a ML(1+8)125° C. in the range of from 30 to 70, a $M_w/M_n$ in the range of from 1.1 to 4.5, wherein said diene is selected from the group consisting of 5-ethylidene-2-norbornene, methylene norbornene, and vinylidene-norbornene; and ii) in the range of from 7 to 20 weight percent of a second olefinic elastomer said second olefinic elastomer having in the range of from 50 to 65 weight percent ethylene, in the range of from 1 to 7 weight percent diene, said second olefinic elastomer having a ML(1+8)125° C. in the range of from 500 to 10,000, a $M_w/M_n$ in the range of from 1.1 to 4.5, wherein said diene is selected from the group consisting of 5-ethylidene-2-norbornene, methylene norbornene, and vinylidene-norbornene; and b) a carbon black, said carbon black present in said vulcanizable olefinic elastomer compound in the range of from 70 to 115 parts per hundred parts elastomer, said carbon black selected from the group consisting of lampblack and flameblack, wherein said carbon black has:

i) an average particle size in the range of from 100 to 120 nanometers;

ii) a particle size distribution in the range of from 50 to 250 nanometers;

iii) a surface area in the range of from 18 to 28 $m^2/g$ as measured by BET adsorption; and iv) a structure in the range of from about 95 to 108 ml/100 g as measured by DBP absorption.

\* \* \* \* \*